United States Patent [19]
Schwanz et al.

[11] 3,951,430
[45] Apr. 20, 1976

[54] SAFETY BELT TAKE-UP DEVICE

[75] Inventors: Wilfried Schwanz, Ahnsen; Ulrich Seiffert, Braunschweig, both of Germany

[73] Assignee: Volkswagenwerk Aktiengesellschaft, Wolfsburg, Germany

[22] Filed: Apr. 28, 1975

[21] Appl. No.: 572,328

[30] Foreign Application Priority Data
May 16, 1974 Germany.............................. 2423777

[52] U.S. Cl. ................................. 280/744; 297/385
[51] Int. Cl.² ........................................ B60R 21/10
[58] Field of Search ............. 280/150 SB; 180/82 C; 297/385, 388, 389

[56] References Cited
UNITED STATES PATENTS

| | | | |
|---|---|---|---|
| 3,871,470 | 3/1975 | Schwanz et al. | 280/150 SB |
| 3,879,054 | 4/1975 | Lindblad | 280/150 SB |
| 3,891,271 | 6/1975 | Fieni | 280/150 SB X |
| 3,901,531 | 8/1975 | Prochazka | 280/150 SB |

FOREIGN PATENTS OR APPLICATIONS

| | | | |
|---|---|---|---|
| 2,234,246 | 1/1974 | Germany | 280/150 SB |
| 2,249,786 | 4/1974 | Germany | 280/150 SB |

*Primary Examiner*—M. H. Wood, Jr.
*Assistant Examiner*—Michael J. Forman
*Attorney, Agent, or Firm*—Brumbaugh, Graves, Donohue & Raymond

[57] ABSTRACT

The invention concerns an improvement in vehicle safety apparatus for sharply retracting a predetermined length of belt at the moment of an impending collision in order to draw the safety belt up firmly against the body of a passenger seated in the vehicle. In a vehicle safety belt take-up device of the type having an intermediate lug holding the safety belt and connected by means of a connecting rod to a piston arranged within a cylinder provided with a propellant charge for applying the belt retracting force when released in response to an actuating sensor, the improvement comprises a stationary backstop for stopping the retracting movement of the intermediate lug, and a locking device for locking the intermediate lug in place after the lug has retracted the belt a predetermined distance against the stationary backstop.

5 Claims, 2 Drawing Figures

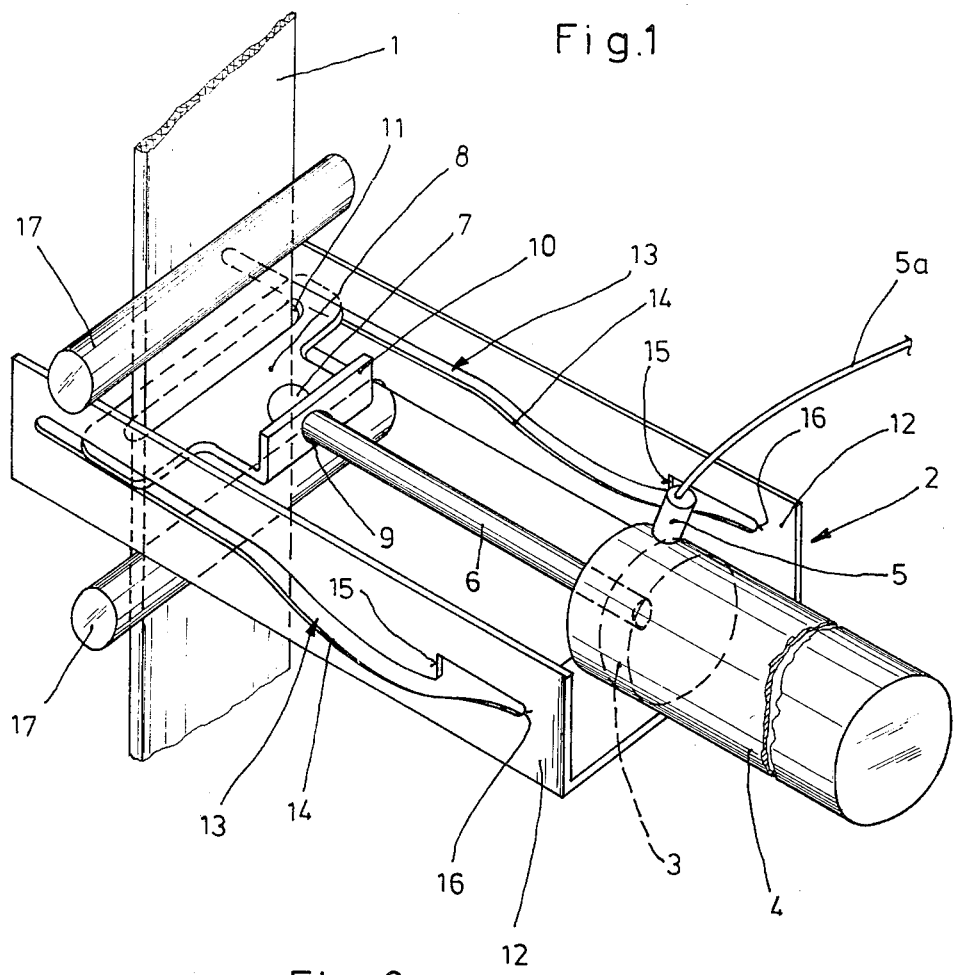
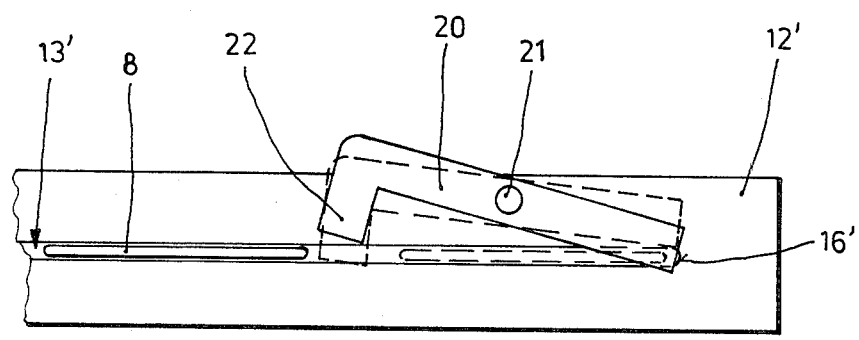

SAFETY BELT TAKE-UP DEVICE

BACKGROUND OF THE INVENTION

The effectiveness of a safety belt in protecting the occupant of a vehicle from being thrown against interior parts of the vehicle during a collision may be improved by tightening the belt (within tolerable limits) at the moment that the restraining force of the belt is needed. Safety belt tension devices are known which draw the safety belt tightly against the body of the vehicle occupant in an impending collision to eliminate the belt slack occurring in service due to the relatively loose application of the belt under normal conditions. U.S. Pat. No. 3,871,470, issued Mar. 18, 1975, discloses a safety belt tension device provided with a piston movable within a cylinder, a selectively releasable pressure medium for driving the piston within the cylinder, a sensor for releasing the medium at the appropriate time, a connecting rod for translating the movement of the piston into a tensioning of the safety belt, and a return stop for maintaining the increased safety belt tension, once applied, to prevent the vehicle occupant from being thrown forward in the event of continued deceleration. The return stop is especially important in accidents in which the vehicle undergoes several successive impacts, as may occur, for example, if the vehicle skids against a series of obstacles or turns over. In the patent mentioned above, the return stop operates directly on the piston connecting rod by means of gripping jaws, arranged concentrically about the connecting rod, having an outer diameter tapering conically inward in the direction of locking and surrounded by jaw closing elements, arranged in the cylinder, having an inner diameter matching the contour of the gripping jaws.

The drawback of this known device is that the elements of the return stop mechanism must be precisely dimensioned and finished to within very close tolerances, thereby necessitating considerable expense in fabrication and assembly.

SUMMARY OF THE INVENTION

It is the general object of this invention to provide a safety belt take-up device which sharply retracts a predetermined length of belt at the moment of an impending collision in order to draw the safety belt up firmly against the body of a passenger seated in the vehicle.

More particularly, it is an object of the present invention to provide an improved vehicle safety belt take-up device which avoids the considerable expense of precision fabrication and assembly of the apparatus. In an improved vehicle safety belt take-up device of the type having an intermediate lug holding the safety belt, a piston displaceable within a cylinder, a connecting rod connecting the intermediate lug to the piston, a propellant charge in the cylinder for applying the belt retracting force through displacement of the piston, and an actuating sensor for releasing the propellant charge upon sensing an impending collision, the improvement, according to the present invention, comprises a stationary backstop for stopping the retraction movement of the intermediate lug after the lug has retracted the belt over a predetermined distance, and means for locking the intermediate lug in place after the lug has been stopped in its retraction movement by the backstop.

In tests with safety belt tension devices, it has been found that the amount of belt slack which has to be eliminated through use of a tension device is generally the same regardless of the size of the passenger or the sitting posture assumed. Accordingly, the present invention obviates the complexity and cost of a return stop mechanism capable of locking the piston connecting rod through a range of retracted positions in favor of having the intermediate lug retract the belt over a predetermined distance against a stationary backstop and arranging locking means to hold the lug fast in the region of the backstop. The lug, travelling the predetermined distance between its normal unactivated position and its stopped position, simply retracts the safety belt a predetermined length sufficient to draw the belt up firmly against the body of the passenger and to adequately tension the belt in anticipation of an impending collision.

In one embodiment of the inventive safety belt take-up device, the intermediate lug has side edges arranged to run along parallel, linear guide tracks which terminate at the stationary backstop. The locking means may be a pivotable lever which is arranged at one end in the region of the back-stop to be displaced against a portion of the backstop by the intermediate lug completing its retraction movement against the backstop such that a locking flange at its other end is swung down to a position holding the lug fast. In a preferred embodiment of the invention the guide tracks dip along a curved course in the region of the backstop and terminate against the backstop. Abutting members are arranged in the direction of belt tension forward of the lug in its fully retracted position against the backstop to intercept the lug from returning in the direction of tension. This latter embodiment creates both the backstop and locking means from the design of the guide tracks alone, and is therefore a particularly simple and reliable device.

DESCRIPTION OF THE DRAWINGS

The further advantages and essential features of the present invention are discussed in detail below, in conjunction with the drawings, of which:

FIG. 1 is a schematic perspective view of a preferred embodiment of the inventive safety belt take-up device in which the guide tracks form both stationary backstop means and locking means; and FIG. 2 is a schematic side view of another embodiment of the present invention having a locking lever in the region of the stationary backstop means.

DETAILED DESCRIPTION

In an exemplary safety belt take-up device shown in FIG. 1, a portion of a safety belt 1, arranged in a vehicle for restraining a seated passenger to his seat, passes through a slot 11 in an intermediate lug 8 at its normal rest position between two parallel rollers 17. The lug 8 is jointedly connected to a piston 3 movable in a cylinder 4 by means of a connecting rod 6, an end 7 of which passes through an aperture 9 in an upturned flange portion 10 formed from the lug 8. The end 7 of connecting rod 6 is reinforced to prevent it from slipping out through the aperture 9.

As a pressure medium for displacing the piston 3 in the cylinder 4, a propellant charge 5 is arranged at a port of cylinder 4 and is released in response to an actuating signal through signal line 5a from an actuating sensor installed on the vehicle. Though not shown in the drawing, the sensor may be responsive to an abrupt deceleration of the vehicle or to an impact against an obstacle.

The lug 8 has side edges held in parallel guide tracks 13 formed in the walls of a frame 12 of the safety belt take-up device 2. The guide tracks 13 dip through a curved section 14 and terminate in a stationary backstop 16. Abutting members 15 are formed by the guide tracks 13 an appropriate distance from the backstop 16 normal to the direction of increased tension on the safety belt 1 which results when the lug 8 executes its retraction movement.

Upon abrupt deceleration or impact of the vehicle with an obstacle, the sensor, not shown in the drawing, actuates the propellant charge 5, whereupon the piston 3 is forcefully driven toward the other end of cylinder 4, taking along with it the lug 8 connected by means of the connecting rod 6. The safety belt 1, held captive by the lug 8, is pulled through the space between the two parallel rollers 17, and in this manner the slack in the safety belt, normally applied loosely about the seated passenger, is sharply taken up.

During its belt retracting movement, the lug 8 is displaced along the guide tracks 13 and describes the curved course 14 before slamming home against the stationary backstop 16 arranged a pedetermined distance from the normal unretracted position of the lug 8 corresponding to the predetermined length of belt slack to be taken up. After the lug 8 has been stopped by the backstop 16, the increased tension on the safety belt 1 tends to pull the lug 8 back away from the backstop 16. As the direction of belt tension is generally along an axis between the two rollers 17 and the backstop 16, the lug 8 is intercepted from returning by the abutting members 15 formed in the guide tracks 13 and arranged normal to the direction of belt tension forward of the lug 8 in its fully retracted position against the backstop 16.

The lug 8 is thus locked in this position and the safety belt 1 is thereby drawn up tightly against the body of the seated passenger, providing positive restraint at the moment that the deceleration forces start to act on the passenger. The particular advantage of the above described embodiment is the simplicity and reliability in the design of the guide tracks 13 forming both locking means, i.e., the arrangement of abutting members 15 normal to the direction of belt tension, and stationary backstop means 16.

In another embodiment of the present invention, shown in FIG. 2, the safety belt take-up device has linear guide tracks 13' formed in the walls of a frame 12' running parallel to the direction of resulting belt tension. The guide tracks 13' terminate in a stationary backstop 16'. A locking lever 20 is pivotably mounted on the frame 12 by a bolt 21 and has one end arranged in the region of the backstop 16', and the other end provided with a locking flange 22 which clears the travel path of the lug 8 in guide tracks 13' when the locking lever 20 is in its normal unactivated position. The lug 8 on its retraction movement toward the backstop 16' displaces the end of the locking lever 20 against a portion of the backstop 16', simultaneously causing the locking flange 22 of the lever 20 to swing down to a locking position indicated by the broken lines in FIG. 2, thereby preventing the lug 8 from being pulled back in the direction of belt tension.

Though not shown in the drawing, a similar locking lever may instead be arranged in the cylinder to prevent the piston, connected to the safety belt through the intermediate lug and connecting rod, from being pulled back by the increased belt tension. In this design, the cylinder must be capable of absorbing the pull of the safety belt restraining the body of the passenger undergoing deceleration forces.

The present invention may be used in connection with virtually all known safety belt arrangements, e.g. two-point or three-point belt systems. Similarly, it may be adaptably located in many possible safety belt configurations, though location of the inventive device in the vicinity of the safety belt anchor or fastening point is preferred, viz., the configuration in which the safety belt take-up device is connected serially between the anchor point and the safety belt end.

It will be understood that the above described embodiments are merely exemplary and that persons skilled in the art may make variations and modifications without departing from the spirit and scope of the invention. All such modifications and variations are intended to be within the scope of the invention as defined in the appended claims.

We claim:

1. An improved safety belt take-up device of the type having a frame, a cylinder arranged on the frame, a piston displaceable within the cylinder, an intermediate lug holding the safety belt, a connecting rod connecting the intermediate lug to the piston, a propellant charge in the cylinder for applying the belt retracting force through displacement of the piston, and an actuating sensor for releasing the propellant charge upon sensing and impending collision, wherein the improvement comprises:
   a. stationary backstop means on said frame for stopping said intermediate lug when moved by said piston from a normal unactivated position to a retracted position against said backstop means, said retracted position being a predetermined distance from said normal unactivated position corresponding to the length of belt to be retracted; and
   b. locking means in conjunction with said backstop means for locking said intermediate lug in place after said lug has retracted the belt over said predetermined distance against said backstop means following release of said propellant charge.

2. An improved safety belt take-up device as described in claim 1, wherein said intermediate lug is jointedly connected with said connecting rod to said piston and is displaceably held in a guideway formed in a wall of said frame.

3. An improved safety belt take-up device as described in claim 2, wherein said guideway forms both said stationary backstop means and said locking means.

4. An improved safety belt take-up device as described in claim 3, wherein said guideway describes a curved course at least within the region of said backstop means, and includes an abutting member in the region of said backstop means, arranged normal to the direction of increased tension on the belt due to the retraction movement of said intermediate lug, for preventing said intermediate lug in said retracted position from being pulled back in the direction of the belt tension.

5. An improved safety belt take-up device as described in claim 1, wherein said locking means is a pivotable locking lever having one end in the region of said backstop means and a locking flange connected to its other end, said locking flange being displaceable into a position preventing said intermediate lug in said retracted position from being pulled back in the direction of increased belt tension, due to the retraction movement of said intermediate lug, when said intermediate lug, on approaching said backstop means, displaces said one end of said locking lever in the region of said backstop means.

* * * * *